Sept. 4, 1956  M. F. ECKER  2,761,711
SELF-CORRECTING HIGH PRESSURE SEAL FOR ROTATING SHAFT
Filed May 15, 1952  3 Sheets-Sheet 1

INVENTOR:
MURRY F. ECKER
BY HIS ATTORNEYS
HARRIS, KIECH, FOSTER & HARRIS

Sept. 4, 1956            M. F. ECKER            2,761,711
SELF-CORRECTING HIGH PRESSURE SEAL FOR ROTATING SHAFT
Filed May 15, 1952            3 Sheets-Sheet 2
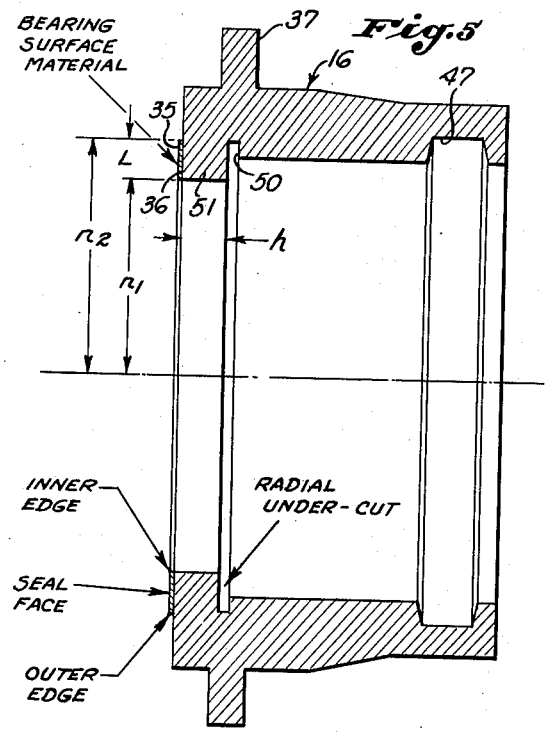
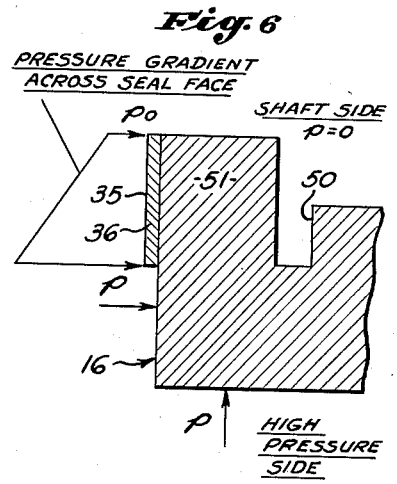
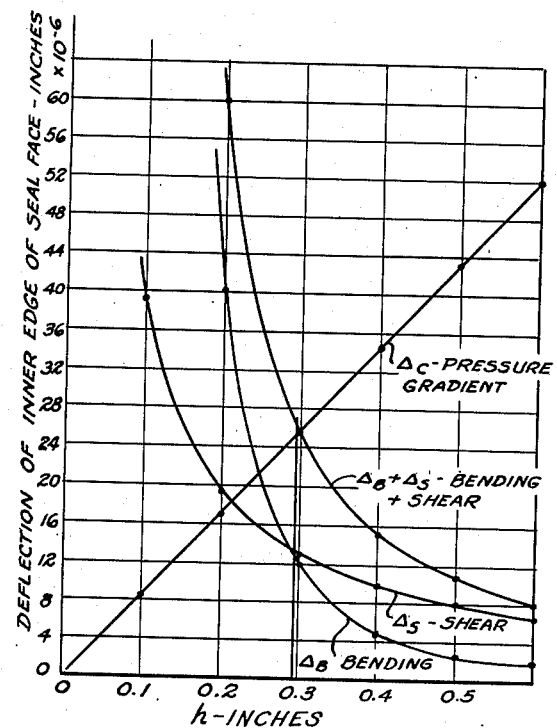
INVENTOR:
MURRY F. ECKER
BY HIS ATTORNEYS
HARRIS, KIECH, FOSTER & HARRIS Sept. 4, 1956  M. F. ECKER  2,761,711
SELF-CORRECTING HIGH PRESSURE SEAL FOR ROTATING SHAFT
Filed May 15, 1952  3 Sheets-Sheet 3

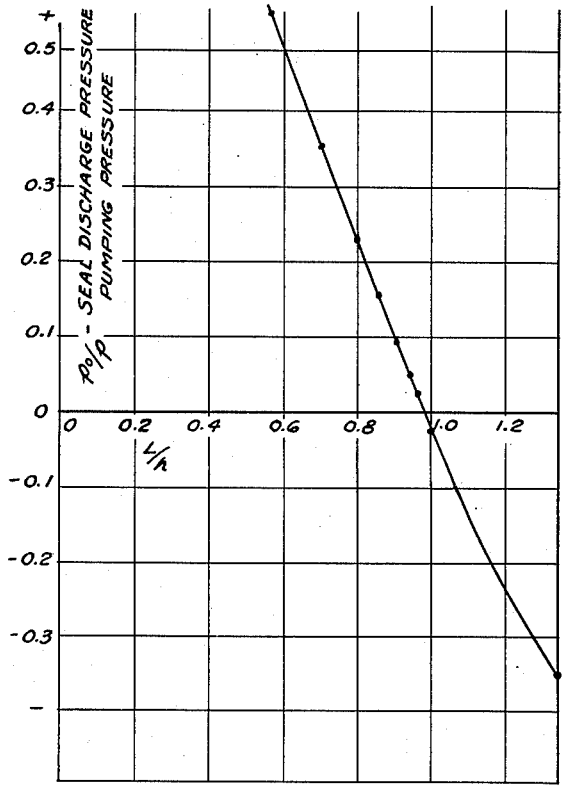

Fig. 8
VALUES OF $P_0/P$ VERSUS $L/h$
FOR EQUATION
$$12(1-\mu^2)\left(\tfrac{1}{20}+\tfrac{3}{40}\tfrac{P_0}{P}\right)\left(\tfrac{L}{h}\right)^4 + \tfrac{6(1+\mu)}{15}\left(H2\tfrac{P_0}{P}\right)\left(\tfrac{L}{h}\right)^2 = \left(1-\tfrac{P_0}{P}\right)$$

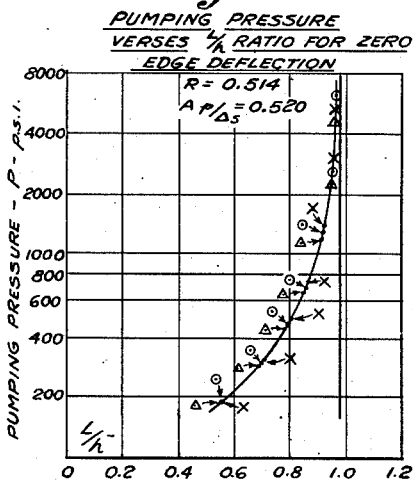

Fig. 9
PUMPING PRESSURE
VERSES $L/h$ RATIO FOR ZERO
EDGE DEFLECTION
$R = 0.514$
$\Delta P/\Delta_s = 0.520$

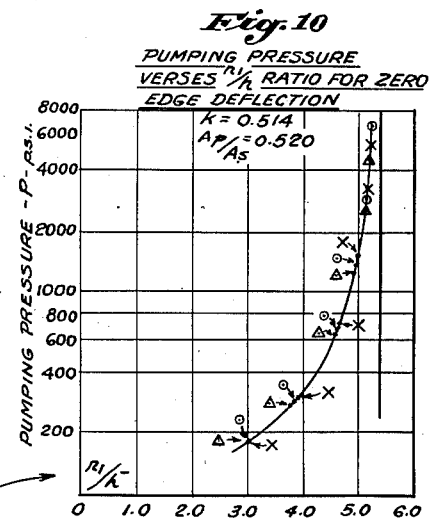

Fig. 10
PUMPING PRESSURE
VERSES $R_1/h$ RATIO FOR ZERO
EDGE DEFLECTION
$k = 0.514$
$\Delta P/\Delta_s = 0.520$ LEGEND
⊙ — $\mu = 0.30$  $E = 30 \times 10^6$  $E_s = 11.5 \times 10^6$ psi
△ — $\mu = 0.25$  $E = 15 \times 10^6$  $E_s = 4 \times 10^6$ psi
✕ — $\mu = 0.35$  $E_s = \dfrac{E}{2(1+\mu)}$ INVENTOR:
MURRY F. ECKER
BY HIS ATTORNEYS
HARRIS, KIECH, FOSTER & HARRIS
By United States Patent Office 2,761,711
Patented Sept. 4, 1956

2,761,711

SELF-CORRECTING HIGH PRESSURE SEAL FOR ROTATING SHAFT

Murry F. Ecker, Downey, Calif., assignor to Pacific Pumps, Inc., Huntington Park, Calif., a corporation of California Application May 15, 1952, Serial No. 287,894

3 Claims. (Cl. 286—11.14)

This invention relates to means for sealing a fluid under high pressure around a rotating member, such as a shaft, and is directed both to such a sealing means and to a method of arriving at an effective design for the sealing means.

A seal of this character comprises a sealing member in the form of a sleeve that rotates with the shaft and cooperates with a matching stationary annular sealing member to form an intervening seal gap of sufficiently small dimension to hold fluid leakage between the two members to an acceptable minimum rate. One of these two sealing members is floatingly mounted to be urged toward the other by fluid pressure and usually by additional spring pressure.

The principles of the present invention are applicable either to the floating sealing member or to the nonfloating sealing member. For the purpose of disclosure and to illustrate the principles involved, however, the invention will be described herein as applied solely to the floating sealing member which, in the selected embodiment of the invention, is a nonrotatable sleeve. The invention may be used to control radially outward pressure but will be described as used to control radially inward pressure.

The basic problem is to maintain a gap configuration and a gap dimension under conditions of high fluid pressure that will adequately control and minimize radially inward leakage flow between the two sealing members.

According to one theory, a definite but exceedingly small fluid-filled gap exists between the two sealing members under conditions of satisfactory sealing operation against a high pressure fluid, there being an equilibrium between the fluid pressure in the gap against the floating sealing member and the opposing pressure on the floating member. The opposing pressure is the sum of the opposing fluid pressure and the spring pressure. It is fundamental that there must be a leakage flow to some degree across the seal gap between the two sealing members under the desired conditions to provide the necessary pressure gradient that accounts for one of the two opposed forces in equilibrium. The equilibrium equation is $$A_g p_e = A_p p + p_s$$

where $A_g$=area of the seal face at the gap; $p_e$=the effective unit pressure resulting from the pressure gradient across the gap; $A_p$=the effective area of the opposite end of the floating member on which the high pressure acts, i. e., the area of fluid pressure unbalance; $p$=the unit pressure of the confined fluid; and $p_s$=the unit pressure on the seal face due to spring load.

It is apparent that the desired equilibrium condition is made possible by the fact that with sufficiently accurately aligned seal faces, the tendency of the force $(A_p p + p_s)$ to close the seal gap is opposed by a sharp rise in the magnitude of $p_e$ as the seal gap narrows. The present invention is based on the discovery that the failure of seals of this character to function properly under especially high fluid pressures is attributable to distortion of the seal gap or misalignment of the seal faces caused by response to the high pressure on the part of the material of the sealing members. The success of the invention lies in the further discovery that one or both of the sealing members can be designed to bring into effect a contrary response to the high pressure on the part of the material that will largely, if not entirely, nullify the troublesome response. In accordance with these discoveries, it is an object of the invention, therefore, to maintain the desired alignment of the seal faces at the seal gap under the application of high pressure by providing for balanced material responses to the high pressure, thereby cancelling out the pressure effects.

Broadly described, the invention attains its object by so shaping at least one of the two sealing members that yield of the member to the high pressure in one respect tending to distort the seal gap in one manner is offset by yield of the member in another respect tending to distort the seal gap in an opposite manner. More specifically described, an object of the invention is to so shape the sealing member that the response in compression of the sealing member tending to distort the seal gap to a fatal extent is compensated for by response of the material in shear and bend tending to restore the required gap configuration.

In general, this object is attained by so shaping the sealing member with respect to its longitudinal configuration as to provide an annular section adjacent the seal face that will act in shear and bend, in effect, to incline the seal face of the member oppositely to the inclination produced by compression of the material. Inclination in this context refers to the seal face as seen in section. Thus, non-uniform contraction of the material under pressure tends to incline the seal face of the member in one respect but the annular section includes the seal face and shifts in shear and bend to incline the seal face in opposite manner.

Another object is to provide an annular recess in the cylindrical member near the selected end to form an annular section with the seal face on one boundary line of the annular section, so that flexure and yield in shear of the annular section will affect the alignment of the seal face. In general, the circumferential recess to form such an annular section will cover at least the same radial zone as the seal face.

The foregoing concepts may be put into practice by forming the desired annular section either by means of an annular recess on the high pressure circumference of the sealing member or on the low pressure circumference, as stated in my co-pending application Serial No. 287,893, entitled High-Pressure Seal for Rotating Shaft, which disclosure is hereby made a part of the present disclosure by reference. An important object of the present practice of the invention, however, is to provide a seal that is highly stable in the sense that it has an inherent tendency to re-establish a sealing film broken by metal-to-metal contact at the seal gap. It has been found that this stability may be achieved by forming the annular recess on the low pressure circumference of the annular sealing member, which circumference in this instance is the inner circumference since the seal is employed to resist inwardly directed fluid pressure.

The various objects, features and advantages of the invention will be understood from the following detailed description considered with the accompanying drawings. In the drawings, which are to be regarded as merely illustrative:

Fig. 5 is an enlarged sectional view of the sealing member showing dimensions to be taken into consideration in analytical calculations;

Fig. 6 is an enlarged fragment of Fig. 5 showing the pressure components involved in the yield of the material;

Fig. 7 is a graph that summarizes the analytical calculations for arriving at a self-compensating configuration for the sealing member; and Figs. 8, 9 and 10 are graphs showing certain pressure and dimensional relationships involved in the design of the sealing member.

Figure 1:
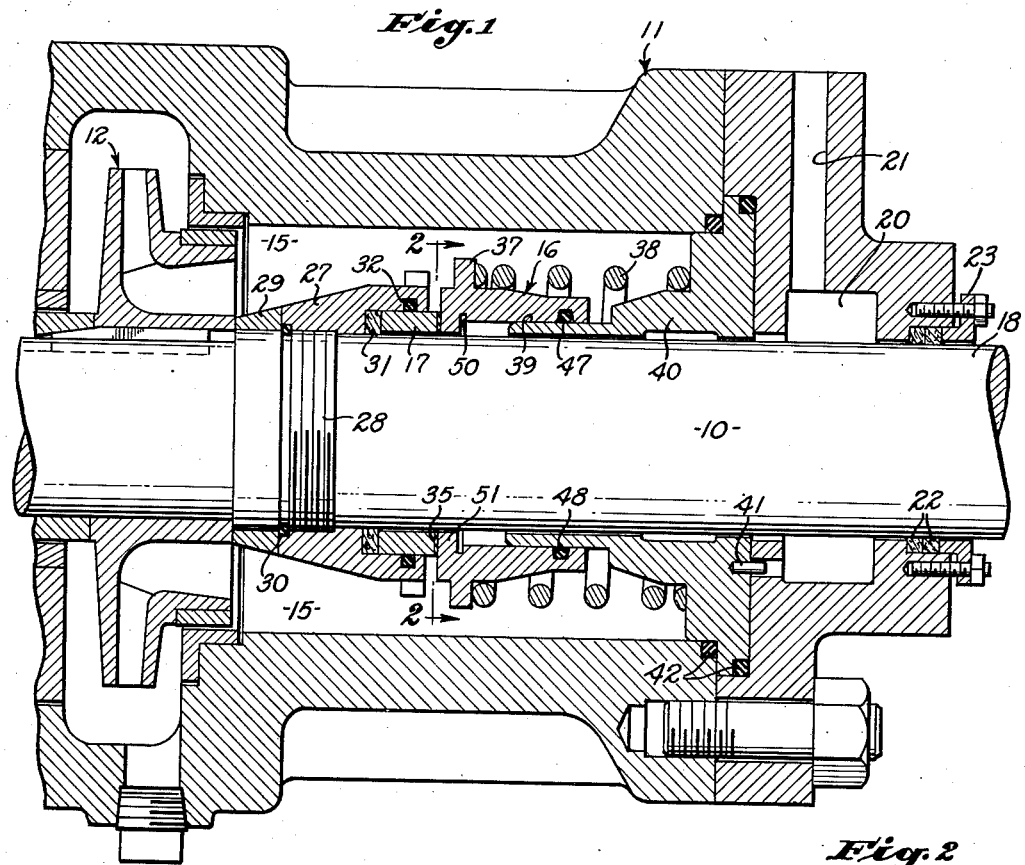
Fig. 1 is a longitudinal sectional view of a high pressure seal that includes a sealing member designed in accord with my invention.
Figure 2:
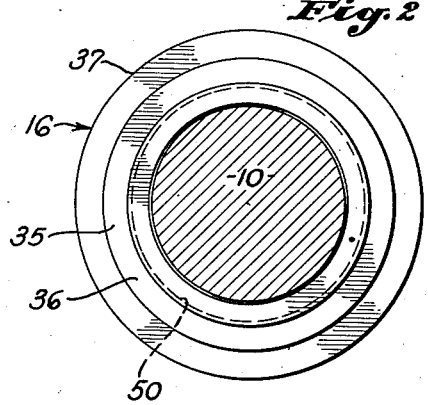
Fig. 2 is a transverse section taken on a line 2—2 of Fig. 1.

Figs. 1 and 2 show, by way of example, how the invention may be embodied in a seal for a shaft 10 that actuates impeller means in a boiler circulating pump, which pump is not shown in the drawing. An extension of the pump casing, designated by numeral 11, encloses an auxiliary circulating means 12 for the fluid under pressure and forms an annular space 15 around the shaft 10 in which the confined fluid is under exceedingly high pressure. In this instance, the contemplated pressure is approximately 2700 p. s. i.

A pair of annular sealing members 16 and 17 have suitable opposed faces forming a radial seal gap and cooperate to seal off the high pressure annular space 15 from the outer end portion 18 of the shaft 10. Radially inward leakage which is controlled at an acceptably low rate moves along the shaft 10 to an annular drainage space 20 from which it is discharged through a passage 21 through the wall of the casing 11. Suitable packing 22 retained by a gland 23 embraces the shaft 10 to seal off the annular drainage space 20 from the exterior of the casing.

Either or both of the two annular sealing members 16 and 17 may be designed in accord with the invention and either of the two members may rotate with the shaft 10, the other of the two members being stationary. In the present construction, it is contemplated that the sealing member 16 will be substantially stationary with respect to rotation but will be floatingly mounted with freedom for longitudinal movement toward the matching sealing member 17 and it is further contemplated that the sealing member 16 will be designed with a self-compensating configuration in accord with the principles heretofore explained.

The sealing member 17 that rotates with the shaft 10 is, in this instance, in the form of a ring of sintered tungsten carbide and is held on the rotating shaft by a suitable retaining sleeve 27. The retaining sleeve 27 has internal threads to engage threads 28 on the shaft 10 and cooperates with a bushing 29 to confine a suitable O-ring 30 to prevent flow of the high pressure fluid along the shaft. The annular sealing member 17 is backed against a packing ring 31 inside the retaining sleeve 27 and is embraced by an O-ring 32 to prevent leakage of the high pressure fluid past its outer circumferential surface. The annular sealing member 16, which is of a configuration in accord with the present teaching, has the general form of a sleeve or cylinder and a seal face 35 (see Figs. 5 and 6) which is faced radially inward from the outer circumferential surface of the sealing member, the face being adjacent the inner circumference of the sealing member to lie close to the shaft 10. In the present example, the material of the sealing member 16 is a suitable stainless steel having a modulus of elasticity in tension of 30,000,000 p. s. i. and having a modulus of elasticity in shear of 11,500,000 p. s. i. and by preference a suitable surface for the seal face 35 is provided by a thin layer or facing 36 of bearing bronze having a thickness on the order of 1/32 in. or 1/16 in. A heavily leaded bronze is preferred in which the lead content is between 20% and 25%. A suitable composition, for example, is 20% lead, 10% tin and 70% copper.

The sealing member 16 has a circumferential shoulder 37 for abutment by a suitable helical spring 38 and slidingly embraces a cylindrical wall 39 of a fixed annular member 40. The annular member 40 is suitably anchored to the casing 11 by a dowel 41.

The inner circumference of the fixed annular member 40 provides enough clearance around the rotating shaft 10 to permit the previously mentioned leakage flow to the annular drainage space 20, but has its outer circumference sealed against longitudinal leakage by a pair of O-rings 42. To prevent leakage of the high pressure fluid between the sealing member 16 and the cylindrical wall 39, the sealing member is formed with an internal circumferential groove 47 to retain a suitable O-ring 48.

Since the seal face 35 of the annular sealing member 16 is adjacent the inner circumference of the sealing member rather than the outer circumference, an annular recess 50 is cut in the inner circumference of the sealing member in accord with the present invention to form an annular section 51 that provides the desired self-correcting yielding action on the part of the annular sealing member. It is contemplated that the radial dimension of the annular recess 50 will be at least as great as the radial dimension of the seal face 35. In this particular example, the two radial dimensions are substantially co-extensive, their inner and outer diameters being substantially the same, as clearly shown in Fig. 6.

Figure 3:
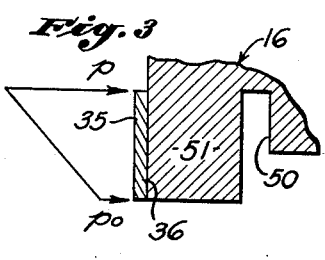
Fig. 3 is an enlarged diagrammatic view indicating in a general manner the pressure gradient that exists across a seal face.
Figure 4:
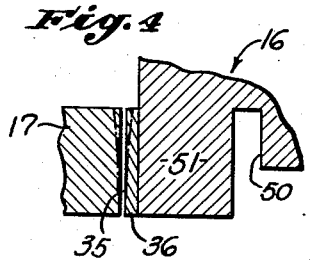
Fig. 4 is a similar diagrammatic view showing how yield of the material in compression tends to distort the seal gap between the two sealing members.

The manner in which the section 51 is subjected to fluid pressure and the general manner in which it will respond to the fluid pressure may be understood by referring to Figs. 3, 4 and 6. Fig. 3 shows the general character of the pressure gradient that is established radially across the seal face 35 by the controlled radially inward leakage flow of the confined fluid. It will be noted that the pressure across the seal face drops from the maximum pressure $p$ of 2700 p. s. i. to a leakage discharge pressure $p_0$. In this exceedingly high pressure range, there is significant yield of the metal in compression so that the two faces of the sealing members that form the seal gap tend to diverge as indicated by the dotted lines in Fig. 4. In effect, the seal face 35 is inclined away from vertical as the face is viewed in radial cross section and it is the resulting distortion of the seal gap that causes the seal to fail of its purpose.

For the purpose of exploring a progressive series of configurations to find one in which the yielding effects are balanced with respect to distortion of the seal gap, a general configuration for the section 51 shown in Fig. 6 may be taken as the starting configuration of the series and this starting configuration may be varied progressively in any suitable manner throughout the series. For example, the angle of the annular recess 50 may be varied progressively by small increments or the distance of the annular recess from the seal face 35 may be varied. In this particular instance, chosen for illustration, the procedure for progressively varying the starting configuration consists in progressively varying the distance of the annular recess 50 from the seal face 35 while maintaining the angle of the annular recess and the radial dimension of the recess constant.

It is apparent from a consideration of Fig. 4 that the distortion of the seal gap is caused by relative shortening of the outer and inner edges of the seal face in response to compression and that the yielding action is essentially shortening of the outer edge. The analytical procedure, therefore, is directed to calculation of the deflection of the outer edge of the seal face with respect to first, deflection caused by bending of the section 51, second, deflection caused by yield of this section in shear and, third, deflection caused by yield of the material to the pressure gradient across the seal face as well as pressure on the boundaries of the section 51 that are exposed to the full pressure of the confined fluid.

For the purpose of calculation, the following symbols and units may be used, the symbols representing various dimensions indicated in Figs. 5 and 6:

$p$ = pumping pressure—p. s. i.
$p_0$ = discharge pressure from seal—p. s. i.
$L$ = length of seal face—inches, $L = r_2 - r_1$
$r_1$ = inner radius of seal face—inches
$r_2$ = outer radius of seal face—inches
$h$ = distance of undercut from end of sleeve 16—inches
$E$ = modulus of elasticity in tension—p. s. i.
$E_s$ = modulus of elasticity in shear—p. s. i.
$\mu$ = Poisson's ratio for the material
$M$ = bending movement due to applied loads—in lbs.
$V$ = shear due to applied load—lbs.
$m$ = bending movement due to unit load-in-lbs.
$v$ = shear due to unit load—lbs.
$b$ = width of annular section—in.
$\Delta_B$ = downward deflection due to bending—in.
$\Delta_s$ = downward deflection due to shear—in.
$\Delta_c$ = relative upward deflection of inner edge of seal due to pressure gradient—in.
$A_p$ = area of hydraulic unbalance—sq. in.
$A_s$ = area of seal face—sq. in.
$t$ = thickness of fluid film between seal faces—in.
$p_s$ = pressure on seal face due to spring load—p. s. i.

$k = \dfrac{2r_2 + r_1}{3(r_2 + r_1)} = 0.514 =$ constant, geometry coefficient of seal $S_e$ = pressure on seal face due to hydraulic and spring loads—p. s. i.

The calculations are based on the following values:

$p = 2700$ p. s. i.
$p_0 = 100$ p. s. i. (estimated)
$L = 0.280$ in.
$r_1 = 1.55$ in.
$r_2 = 1.83$ in.
$E = 30,000,000$ p. s. i. (stainless steel)
$\mu = 0.30$ (stainless steel)
$E_s = 11,500,000$ p. s. i. (stainless steel)
$R = 0.514$
$A_p = 1.555$ sq. in.
$A_s = 3.0$ sq. in.
Spring force = 150 lbs.

At the outset, it is necessary to assume some specific pressure gradient across the seal face 35. For the purpose of the present calculation, $p_0$ is assumed to be 100 p. s. i.

The deflection of the inner edge of the seal face due to bending may be calculated by applying the principle of virtual work and flat plate theory. This method gives the following expression for bending deflection:

$$\Delta_B = 12(1-\mu^2) \int_0^L \frac{Mm\,ds}{Ebh^3}$$

The assumptions made in this analysis are as follows:
(1) The annular section 51 is considered as having constant width, the radial taper being neglected;
(2) The resisting section is considered as a cantilever beam;
(3) The circumferential forces are neglected in calculating bending moments, a consequence of the first assumption.

The above expression also includes a factor from flat plate theory which accounts for the restraint of the material on either side of the section 51.

Applying the above principles and assumptions, the expression for the deflection of the inner edge of the seal face due to bending is determined as follows:

Equation No. 1:

$$\Delta_B = \frac{12(1-\mu^2)}{Eh^3} pL^4 \left(\frac{1}{20} + \frac{3}{40}\frac{p_0}{p}\right)$$

The deflection of the inner edge of the seal face due to shear may be calculated by applying the principle of virtual work. This method gives the following expression for shear deflections:

$$\Delta_s = \frac{144}{120} \int_0^L \frac{LVv\,ds}{bhE_s}$$

The assumption made in this expression is that the section 51 has constant width, the radial taper being neglected. Applying the above principle and assumption, the expression for the deflection of the inner edge of the seal face due to shear is determined as follows:

Equation No. 2:

$$\Delta_s = \frac{3pL^2}{15hE_s}\left(1 + 2\frac{p_0}{p}\right)$$

As heretofore stated, the pressure gradient across the seal face causes deflection of the inside edge of the seal face relative to the outside edge that is opposite to the deflections caused by bend and shear. Applying Hook's law and noting the pressure difference between the inner and outer edges of the seal face, the expression for the relative deflection of the outer edge is as follows:

Equation No. 3:

$$\Delta_c = \frac{hp}{E}\left(1 - \frac{p_0}{p}\right)$$

Equation Nos. 1 and 2 give the downward deflection of the inner edge of the seal face due to bending and shear. Equation No. 3 gives the relative upward deflection of the inner edge of the seal face due to the pressure gradient. If the inner edge is to have zero relative movement with respect to the outer edge, the sum of the deflections due to bending and shear should be equal to the relative upward movement due to the pressure gradient.

$$\Delta_B + \Delta_s = \Delta_c$$

Equation No. 4:

$$\frac{12(1-\mu^2)pL^4}{Eh^3}\left(\frac{1}{20} + \frac{3}{40}\frac{p_0}{p}\right) + \frac{3pL^2}{15E_sh}\left(1 + 2\frac{p_0}{p}\right) = \frac{hp}{E}\left(1 - \frac{p_0}{p}\right)$$

For a given set of conditions as to pressures and seal dimensions the above equation may be used to calculate the distance $h$.

Using the values heretofore stated, calculations in accord with the above equations give the following results:

| $h$ in inches | Deflections in Inches | | | |
| --- | --- | --- | --- | --- |
| | Bending $\Delta_B$ | Shear $\Delta_s$ | Bending+Shear $\Delta_B+\Delta_s$ | Pressure Gradient $\Delta_c$ |
| 0.10 | 3.21×10⁻⁴ | 3.95×10⁻⁵ | 360.5×10⁻⁵ | 8.66×10⁻⁶ |
| 0.20 | 0.402 | 1.97 | 59.9 | 17.32 |
| 0.30 | 0.119 | 1.32 | 25.1 | 25.98 |
| 0.40 | 0.052 | .99 | 15.1 | 34.64 |
| 0.50 | 0.0257 | .79 | 10.5 | 43.30 |
| 0.60 | 0.01475 | .66 | 8.1 | 51.96 |

A direct solution of Equation No. 4 for the distance $h$ for the above dimensions of the seal gave a value of:

$$h = 0.285 \text{ in.}$$

These results are presented in graphical form in Fig. 7.

It may be noted in passing that the change in shape of the section 51 in making these balanced deflections results in a slight hump in the middle of the seal face. Applying the same calculations to the deflection at the mid-seal it is found that the surface at the center of the seal face is approximately $4 \times 10^{-6}$ in. above the inner edge, a difference so slight as to have no significance in the operation of the seal.

The analytical calculations are also useful in leading to certain generalizations about the factors involved in designing such a self-compensating sealing member. For example, using the expression for shear modulus of elasticity $$E_s = \frac{E}{2(1+\mu)}$$

in Equation No. 4 and dividing the equation by the product $(h)$ $(p)$ the equation reduces to:

Equation No. 5:

$$12(1-\mu^2)\left(\frac{L}{h}\right)^4\left(\frac{1}{20}+\frac{3}{40}\frac{p_0}{p}\right) + \frac{6(H\mu)}{15}\left(\frac{L}{h}\right)^2\left(1+2\frac{p_0}{p}\right) = \left(-\frac{p_0}{p}\right)$$

This is a fourth power equation relating the $L/h$ ratio of the seal with the pressure ratio, $p_0/p$. An examination of the equation indicates that of the four roots, two are imaginary, one is minus real and one is plus real. The plus real root is the only one of any practical significance. A direct solution of this equation for the plus real root would be difficult. Consequently a graphical solution was used. This procedure was as follows: From previous calculations and test data the range of values for $h$ which were satisfactory were known. The length of the seal face, $L$, was held constant at 0.280 in., the dimension of the seal tested. Various values of $h$ were assumed and the resulting values of the pressure ratio, $p_0/p$, were calculated from the above deflection equation (Equation No. 5). The values of the $L/h$ ratio for various values of the pressure ratio $p_0/p$, which satisfy Equation No. 5 are shown in Fig. No. 8. The positive section of the resulting curve is the portion which has significance in this investigation. The negative portion would indicate a vacuum on one side of the seal. As the ratio of the pressures, $p_0/p$, approaches zero the pumping pressure, $p$, increases to infinity. The discharge pressure does not go to zero as this would indicate a zero surface tension for the fluid or an extremely large film thickness between the seal faces, both of which are impossible. Consequently, the value of the zero intercepts for the ratio of $p_0/p$ as determined from Fig. 8 gives the infinitely high value of the pumping pressure towards which $p$ increases asymptotically. In calculating the values of pumping pressure, $p$, for various $L/h$ ratios, the previously mentioned equation based on the surface tension theory is used.

The graphs shown in Figs. 9 and 10 provide information that is helpful in applying the principles of the invention to the design of annular sealing members. To arrive at the data for Fig. 9 various values of $p_0/p$ were used in the surface tension equation $$p_0 = \frac{p_s + p\left(\frac{A_p}{A_s}-k\right)}{1-k}$$

to determine the pumping pressure $p$. These values of $p$ are then plotted as a function of the $L/h$ ratio, the result being the graph shown in Fig. 9. Fig. 10 is the same as Fig. 9 except the length of the seal face $L$ has been replaced by inner radius of the seal face $r_1$.

In this analysis the only material property which appears is Poisson's ratio in the deflection equation, Equation No. 5. It will be noted that the graphs in Figs. 9 and 10 involve three different values of Poisson's ratio, namely, 0.25, 0.30, and 0.35. These values will be satisfactory for all materials practical for an annular sealing member.

From Figs. 9 and 10 can be obtained the ratio of the seal face width to the distance $h$ for satisfactory sealing action. The general design relations as presented in these two figures indicate that in the high pressure region for all practical purposes a single value of $h$ will be satisfactory for a range of pumping pressures. For example:

$p=3000$ p. s. i. $L/h=.93$ $L=0.280$ in. $h=.260$ in.
$p=1500$ p. s. i. $L/h=.91$ $L=0.280$ in. $h=.255$ in.

The results presented in Figs. 9 and 10 clearly indicate that the function of the seal is independent of the material of construction. The magnitude of the deflections are influenced by the material but since the opposite deflections balance, the function of the seal is more or less independent of the material used.

The results of the analytical investigation of the described undercut mechanical seal were substantiated by several laboratory tests, thus the analytical approach in this instance is completely successful in arriving at a configuration for the sealing member that functions in the self-compensating manner. The laboratory tests also substantiated the stability of the seal. If the fluid film in the seal gap is broken for any reason, the pressure gradient across the seal face is removed but with the undercut on the low pressure side of the seal there is no tendency for the seal to remain closed. Instead, the high pressure fluid on the outside of the seal causes the seal faces to open to allow the fluid film to be re-established. Thus, if the fluid film is ruptured, the seal automatically avoids running with metal-to-metal contact by automatically opening to re-establish the seal.

My disclosure will suggest to those skilled in the art various departures and alternative procedures in the application of the underlying concepts of the invention that properly lie within the spirit and scope of my appended claims.

I claim as my invention:

1. A device for providing a seal between a very high pressure region and a low pressure region, including an annular sealing member and a mating annular member respectively provided with radially extending annular sealing faces cooperating to form therebetween a radially extending, annular sealing gap the outer end of which communicates with the high pressure region and the inner end of which communicates with the low pressure region, the pressure in said gap progressively increasing from said inner end to said outer end thereof, said sealing member including an annular body section and an annular section integrally joined to said body section at one end only of said annular section, said annular section having an end which forms said sealing face of said sealing member and which is thereby exposed to the pressures in said gap, said sealing member having an internal annular recess bounded in part by an annular surface constituting a second side of said annular section facing away from said gap and exposed to said low pressure region, said recess being of such depth that the radial extent of said annular surface is substantially equal to the radial extent of said sealing faces and axially opposed thereto, means mounting said sealing member and annular mating member for relative rotation about an axis and means urging said members axially together to maintain said annular sealing faces in sealing relation whereby as the pressure in said gap widens the same at the outer end thereof by compressing the material of said members, that same pressure distorts said annular section by moving the inner edge thereof toward said recess to widen the inner end of said gap and return said sealing faces to substantial parallelism.

2. A device as defined in claim 1 in which the spacing between said sealing face and said annular surface is of the same order of magnitude as the radial length of said gap.

3. A device as defined in claim 1 wherein the ratio of the radial length of said gap to the spacing between said sealing face and said annular surface is of the same order of magnitude as 0.9.

References Cited in the file of this patent

UNITED STATES PATENTS

| | | |
|---|---|---|
| 1,900,849 | Ackerman | Mar. 7, 1933 |
| 2,220,771 | McHugh | Nov. 5, 1940 |
| 2,370,964 | Janette | Mar. 6, 1945 |
| 2,503,086 | Albright | Apr. 4, 1950 |
| 2,504,937 | Payne | Apr. 18, 1950 |

FOREIGN PATENTS

| | | |
|---|---|---|
| 632,957 | Great Britain | Apr. 4, 1950 |